United States Patent
Liu et al.

(10) Patent No.: US 10,728,247 B1
(45) Date of Patent: Jul. 28, 2020

(54) SELECTING AN AUTHENTICATION SYSTEM FOR HANDLING AN AUTHENTICATION REQUEST

(71) Applicant: Alibaba Group Holding Limited, George Town (KY)

(72) Inventors: Yang Liu, Hangzhou (CN); Shiji Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/805,025

(22) Filed: Feb. 28, 2020

Related U.S. Application Data

(63) Continuation of application No. PCT/CN2020/071977, filed on Jan. 14, 2020.

(30) Foreign Application Priority Data

Aug. 2, 2019 (CN) .......................... 2019 1 0710503

(51) Int. Cl.
  *H04L 29/06* (2006.01)
(52) U.S. Cl.
  CPC ...... *H04L 63/0884* (2013.01); *H04L 63/0823* (2013.01); *H04L 63/0892* (2013.01)
(58) Field of Classification Search
  CPC ............. H04L 63/0884; H04L 63/0892; H04L 63/0823
  See application file for complete search history.

(56) References Cited

U.S. PATENT DOCUMENTS

| | | | |
|---|---|---|---|
| 8,813,186 B2* | 8/2014 | Hegg | H04L 63/0876 726/2 |
| 9,954,846 B2* | 4/2018 | Butterfield | H04L 63/08 |
| 2004/0010682 A1* | 1/2004 | Foster | H04L 63/126 713/156 |
| 2007/0113086 A1* | 5/2007 | Huang | H04L 63/08 713/168 |

(Continued)

FOREIGN PATENT DOCUMENTS

| CN | 1992596 | 7/2007 |
|---|---|---|
| CN | 109327477 | 2/2019 |
| CN | 110460595 | 11/2019 |

OTHER PUBLICATIONS

Lu et al., "A Secure Microservice Framework for IoT", 2017 IEEE Symposium on Service-Oriented System Engineering (Year: 2017).*

(Continued)

*Primary Examiner* — Chau Le
(74) *Attorney, Agent, or Firm* — Fish & Richardson P.C.

(57) ABSTRACT

Implementations of this disclosure provide an authentication system for handling authentication requests. An example method performed by a server includes receiving an access request that includes identification information to be used by the server for selecting a target authentication system, and determining that the access request does not have access permission. In response to determining that the access request does not have access permission, the server selects the target authentication system from at least two authentication systems, based on a predetermined authentication system selection policy and based on the identification information in the access request, and sends the access request to the selected target authentication system for authentication.

19 Claims, 7 Drawing Sheets

(56) References Cited

U.S. PATENT DOCUMENTS

| | | | |
|---|---|---|---|
| 2017/0237734 A1* | 8/2017 | Hallenborg | H04L 63/0884 |
| | | | 726/7 |
| 2018/0234523 A1* | 8/2018 | Jose | H04L 41/06 |
| 2018/0321996 A1* | 11/2018 | Riva | G06F 9/547 |
| 2018/0330068 A1 | 11/2018 | Mori | |
| 2019/0386973 A1* | 12/2019 | Patwardhan | G06F 9/45558 |

OTHER PUBLICATIONS

Jander et al., "Defense-in-depth and Role Authentication for Microservice Systems", the 9th International Conference on Ambient Systems, Networks and Technologies (ANT 2018), Procedia Computer Science 130 (2018) 456-463 (Year: 2018).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071977, dated Apr. 24, 2020, 14 pages (with partial machine translation).

* cited by examiner

SELECTING AN AUTHENTICATION SYSTEM FOR HANDLING AN AUTHENTICATION REQUEST

CROSS-REFERENCE TO RELATED APPLICATIONS

This application is a continuation of PCT Application No. PCT/CN2020/071977, filed on Jan. 14, 2020, which claims priority to Chinese Patent Application No. 201910710503.0, filed on Aug. 2, 2019, and each application is hereby incorporated by reference in its entirety.

TECHNICAL FIELD

The present disclosure relates to selecting authentication systems for handling authentication requests.

BACKGROUND

Before a user accesses a system, the system needs to verify access permission of the user, to determine whether the user has permission to access the system. Specifically, the user sends an access request to the system, and the system determines, based on the received access request, whether the user has access permission. If the user has access permission, the system allows the user to access the system.

In a conventional verification process, an authentication system is usually used to verify access permission of an access request. The authentication system acknowledges access permission of a user based on login information provided by the user, such as a username and a password, and generates permission information after login verification on the user succeeds, so that the system can perform authentication on access permission of the access request based on the permission information in a subsequent access process.

SUMMARY

In view of the previous description, implementations of the present specification provide authentication and business service methods, apparatuses, and devices.

The following technical solutions are used in the implementations of the present specification.

An implementation of the present specification provides an authentication method, including: receiving an access request; when determining that the access request does not have access permission, determining a target authentication system from at least two authentication systems based on a predetermined authentication system selection policy and based on identification information in the access request, where the authentication system selection policy specifies mapping relationships between identification information and authentication systems, and the at least two authentication systems are separately deployed in a micro service framework as micro service components; and sending the access request to the target authentication system, so that the target authentication system performs authentication on the access request.

An implementation of the present specification provides a business service method, including: receiving a business service request; when determining that the business service request does not have access permission, determining a target authentication system from at least two authentication systems based on a predetermined authentication system selection policy and based on identification information in the business service request, where the authentication system selection policy specifies mapping relationships between identification information and authentication systems, and the at least two authentication systems are separately deployed in a micro service framework as micro service components; sending the business service request to the target authentication system, so that the target authentication system performs authentication on the business service request; and when determining that the authentication on the business service request in the target authentication system succeeds, sending the business service request to a corresponding business service system, so that the business service system provides a business service based on the business service request.

An implementation of the present specification provides an authentication apparatus, including a receiving unit, a determining unit, and a sending unit, where the receiving unit receives an access request; when determining that the access request does not have access permission, the determining unit determines a target authentication system from at least two authentication systems based on a predetermined authentication system selection policy and based on identification information in the access request, where the authentication system selection policy specifies mapping relationships between identification information and authentication systems, and the at least two authentication systems are separately deployed in a micro service framework as micro service components; and the sending unit sends the access request to the target authentication system, so that the target authentication system performs authentication on the access request.

An implementation of the present specification provides an authentication system, including an authentication unit and an interception unit, where at least two authentication systems are deployed in the authentication unit based on a micro service framework, and the at least two authentication systems are separately deployed in the micro service framework as micro service components; the interception unit receives an access request; when determining that the access request does not have access permission, the interception unit determines a target authentication system from the at least two authentication systems based on a predetermined authentication system selection policy and based on identification information in the access request, where the authentication system selection policy specifies mapping relationships between identification information and authentication systems; and the interception unit sends the access request to the target authentication system, so that the target authentication system performs authentication on the access request.

An implementation of the present specification provides a business service apparatus, including a receiving unit, a determining unit, and a sending unit, where the receiving unit receives a business service request; when determining that the business service request does not have access permission, the determining unit determines a target authentication system from at least two authentication systems based on a predetermined authentication system selection policy and based on identification information in the business service request, where the authentication system selection policy specifies mapping relationships between identification information and authentication systems, and the at least two authentication systems are separately deployed in a micro service framework as micro service components; the sending unit sends the business service request to the target authentication system, so that the target authentication system performs authentication on the business service request;

and when determining that the authentication on the business service request in the target authentication system succeeds, the sending unit sends the business service request to a corresponding business service system, so that the business service system provides a business service based on the business service request.

An implementation of the present application provides an electronic device for authentication, including at least one processor and a memory, where the memory stores a program, and the at least one processor is configured to perform the following steps: receiving an access request; when determining that the access request does not have access permission, determining a target authentication system from at least two authentication systems based on a predetermined authentication system selection policy and based on identification information in the access request, where the authentication system selection policy specifies mapping relationships between identification information and authentication systems, and the at least two authentication systems are separately deployed in a micro service framework as micro service components; and sending the access request to the target authentication system, so that the target authentication system performs authentication on the access request.

An implementation of the present application provides an electronic device for a business service, including at least one processor and a memory, where the memory stores a program, and the at least one processor is configured to perform the following steps: receiving a business service request; when determining that the business service request does not have access permission, determining a target authentication system from at least two authentication systems based on a predetermined authentication system selection policy and based on identification information in the business service request, where the authentication system selection policy specifies mapping relationships between identification information and authentication systems, and the at least two authentication systems are separately deployed in a micro service framework as micro service components;

sending the business service request to the target authentication system, so that the target authentication system performs authentication on the business service request; and when determining that the authentication on the business service request in the target authentication system succeeds, sending the business service request to a corresponding business service system, so that the business service system provides a business service based on the business service request.

The previously described at least one technical solution used in the implementations of the present specification can achieve the following beneficial effects: According to the authentication method provided in the implementations of the present specification, the at least two authentication systems are separately deployed in the micro service framework as micro service components. When it is determined that the access request does not have access permission, the target authentication system is determined based on the authentication system selection policy and based on the identification information in the access request, and then the access request is sent to the target authentication system, so that the target authentication system performs authentication on the access request. Therefore, the authentication method can ensure successful execution of an authentication process while being compatible with multiple authentication systems, to alleviate unnecessary confusion. In addition, the authentication method has simple configuration and is easy to operate.

BRIEF DESCRIPTION OF DRAWINGS

To describe technical solutions in implementations of the present specification or in the existing technology more clearly, the following briefly describes the accompanying drawings needed for describing the implementations or the existing technology. Clearly, the accompanying drawings in the following description merely show some implementations recorded in the present specification, and a person of ordinary skill in the art can still derive other drawings from these accompanying drawings without creative efforts.

DESCRIPTION OF IMPLEMENTATIONS

To make a person skilled in the art better understand the technical solutions in the present specification, the following clearly and comprehensively describes the technical solutions in the implementations of the present specification with reference to the accompanying drawings in the implementations of the present specification. Clearly, the described implementations are merely some rather than all of the implementations of the present application. All other implementations obtained by a person of ordinary skill in the art based on the implementations of the present specification without creative efforts shall fall within the protection scope of the present application.

As previously analyzed, in a conventional verification process, after receiving an access request from a user, a system directly sends the access request to an authentication system for authentication. However, in the conventional verification process, only a homogeneous authentication system is included, that is, only one type of authentication system can be used for all access requests for authentication. In an actual use process, to satisfy an actual use demand, different authentication systems need to be used for different access requests for authentication. Therefore, when more than one authentication system needs to be used in a verification process, the conventional verification process cannot satisfy a use demand.

Figure 1:
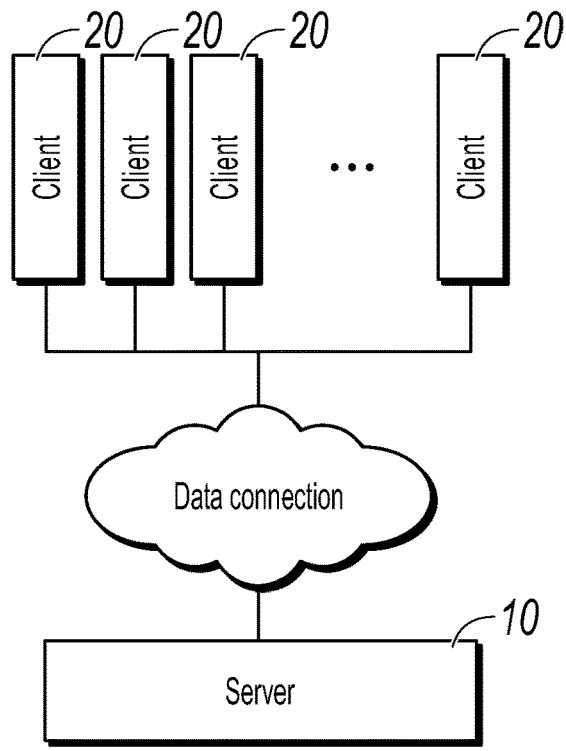
FIG. 1 is a schematic application diagram illustrating an authentication method, according to an implementation of the present specification.

Based on the previous description, the implementations of the present specification provide an authentication and business service method, apparatus, and device. A schematic application diagram can be shown in FIG. 1, and includes server 10 and at least one client 20.

Client 20 accesses server 10 to obtain a service from server 10. For example, client 20 can send an access request to server 10 to obtain a service from server 10. At least two authentication systems are disposed in server 10. The authentication system performs authentication on a received access request to determine whether the access request has access permission.

Client 20 can include a terminal device that needs to access server 10, including but not limited to a computer, a tablet computer, a mobile phone, etc.; or can include an application program that needs to access server 10. The application program can be mounted on a terminal device. For example, the application program can be a browser.

Interaction between client 20 and server 10 is implemented by using a data connection.

Specifically, an entire idea of the authentication method provided in the implementations of the present specification is as follows: The at least two authentication systems in server 10 are separately deployed in a micro service framework as micro service components. The micro service framework is a specific method for designing a software application program as a service suite that can be independently deployed, software in the micro service framework is split into different services to implement componentization, and components are independent of each other. Therefore, the at least two authentication systems are deployed by using the previously described solution, so that each authentication system can be completely encapsulated in an independent component without modification and can independently provide an original complete service of the authentication system, and the authentication systems do not interfere with each other. Such a deployment method is quick and easy, and also ensures function integrity of the authentication system, so that the authentication system can independently run an authentication service. During verification, an access request including identification information is received from client 20; when it is determined that the access request does not have access permission, a target authentication system is determined from the at least two authentication systems based on a predetermined authentication system selection policy and based on the identification information, where the authentication system selection policy specifies mapping relationships between identification information and authentication systems, so that the access request can be accurately allocated to the authentication system, and different access requests do not affect each other, thereby alleviating confusion in a processing process; and then, the access request is sent to the target authentication system, so that the target authentication system is used to perform authentication on the access request. Because the target authentication system has been determined before the authentication, the authentication on the access request can be accurately performed by the corresponding target authentication system. In addition, because the authentication system runs independently, authentication on access requests from different sources can be separately performed without affecting each other. This ensures authentication accuracy and also improves authentication efficiency. In the previously described authentication process, because the authentication systems are independent of each other, an access request can be effectively allocated to a corresponding authentication system for independent authentication. Therefore, in the authentication process, authentication processes of different access requests do not interfere with each other, so that the authentication method provided in the implementations of the present specification can ensure successful execution of authentication while being compatible with multiple authentication systems.

The technical solutions provided in the implementations of the present application are described in detail below with reference to the accompanying drawings.

Implementation 1

Figure 2:
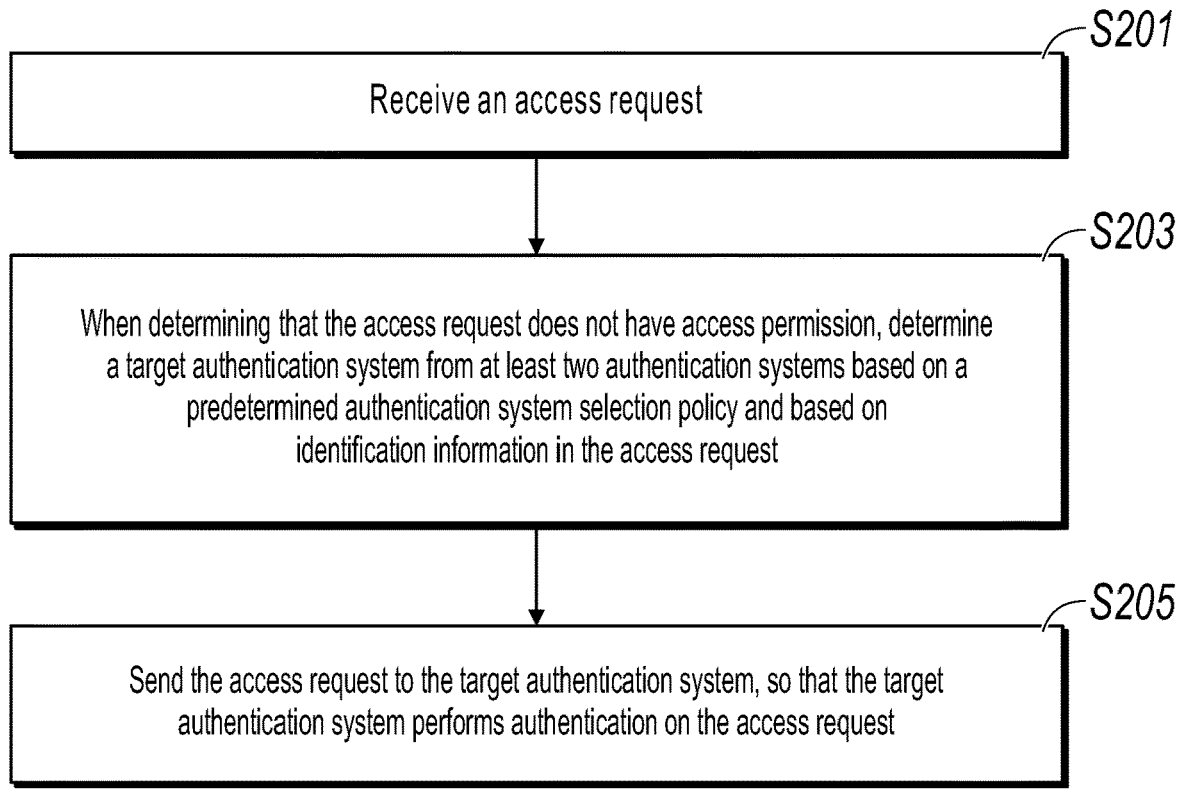
FIG. 2 is a flowchart illustrating an authentication method, according to an implementation of the present specification.

FIG. 2 is a flowchart illustrating an authentication method, according to an implementation of the present specification.

As shown in FIG. 2, the authentication method in this implementation of the present specification includes the following steps.

Step S201: Receive an access request.

The access request is a request sent by a client when the client accesses a server.

In practice, generation of the access request can be triggered by the client based on an operation performed by a user on the client, or can be automatically triggered based on predetermined service logic of the client. A factor for trigging generation of the access request is not specifically limited in this implementation of the present application. For example, if the user clicks on a function button on the client, the access request is generated based on a service function corresponding to the function button.

Step S203: When determining that the access request does not have access permission, determine a target authentication system from at least two authentication systems based on a predetermined authentication system selection policy and based on identification information in the access request.

The at least two authentication systems are separately deployed in a micro service framework as micro service components.

Specifically, a complete authentication system can be independently deployed in the micro service framework as a micro service component and independently provides an authentication service, and the authentication systems neither affect each other nor interfere with each other. In such a deployment method, the authentication system can be directly used without modification, so that an original function of the authentication system is completely reserved. In addition, multiple authentication systems can be deployed in the micro service framework based on an actual use demand, so that the deployment method has better extensity, is convenient for deployment, and is easy to operate.

It is worthwhile to note that common authentication methods can include HTTP Basic Authentication, session-cookie, token, OAuth (Open Authorization), etc. The authentication systems can use different authentication methods for different access requests. For example, the session-cookie authentication method can be used for a PC client, and the token authentication method can be used for a mobile client. The at least two authentication systems in this implementation of the present specification can perform authentication on access requests from different types of clients. For example, when there are two authentication systems, one authentication system performs authentication on an access request from a PC client by using the session-cookie method, and the other authentication system performs authentication on an access request from a mobile client by using the token method. Alternatively, the at least two authentication systems in this implementation of the present specification can perform authentication on different access requests from the same type of client. For example, when there are two authentication systems, both the two authentication systems perform authentication on access requests from PC clients by using the session-cookie method. In this case, the two authentication systems can separately perform authentication on access requests for obtaining different services, or separately perform authentication on access requests from different types of PC clients.

It is worthwhile to further note that in this implementation of the present specification, whether the access request has access permission can be determined by performing authentication on permission information in the access request. If the authentication on the permission information succeeds, the access request has access permission; or if the authentication on the permission information fails, the access request does not have access permission. The permission information includes permission information generated by the target authentication system when authentication on an access request including login information succeeds, and the access request including the login information is an access request sent by a transmitter of the access request before sending the access request. The client stores the permission information after receiving the permission information generated by the target authentication system, so that the permission information can be set in an access request subsequently generated by the client, to determine whether the subsequently generated access request has access permission.

The identification information includes information that identifies the target authentication system. For example, when access requests from different access sources correspond to different authentication systems, information that can identify an access request source can be used as identification information. For another example, when different service types correspond to different authentication systems, a service type corresponding to an access request can be used as identification information. For still another example, recognition information of an authentication system can be used as identification information.

In an application example, to simply and effectively set the identification information, the identification information includes at least one of a uniform resource locator (URL), a uniform resource identifier, and an authentication system interface parameter. For example, the identification information is the URL. In this case, when authentication system A is used to perform authentication for an external network client and authentication system B is used to perform authentication for an internal network client, URL information in an access request sent by the external network client indicates that the external network client needs to access authentication system A, and URL information in an access request sent by the internal network client indicates that the internal network client needs to access authentication system B.

Further, in this implementation of the present specification, mapping relationships between identification information and authentication systems are pre-stored in the authentication system selection policy. After the access request is received, the target authentication system corresponding to the access request is determined based on the mapping relationships in the authentication system selection policy and based on the identification information in the access request.

Because the authentication system selection policy is set, once the identification information is obtained, the corresponding authentication system can be determined based on the mapping relationships between identification information and authentication systems, thereby ensuring that the access request can be obtained by the corresponding authentication system, alleviating unnecessary confusion in an authentication process, and ensuring accuracy of a subsequent process.

Step S205: Send the access request to the target authentication system, so that the target authentication system performs authentication on the access request.

In this implementation of the present specification, the authentication system includes a system configured to verify access permission based on login information. For example, the authentication system can be a system that verifies access permission based on a username and a password, or can be a system that verifies access permission based on information that is acknowledged by the authentication system and that can identify a legal user identity.

In an application example, the access request further includes login information; and that the target authentication system performs authentication on the access request includes: the target authentication system performs authentication on the access request based on the login information.

Specifically, when the access request received by the target authentication system includes the login information, the target authentication system directly obtains the login information from the access request, and determines, based on the login information, whether the access request has access permission.

It is worthwhile to note that when the access request received by the target authentication system does not include the login information, the target authentication system receives an access request that includes the login information and that is sent by the client corresponding to the access request, and then determines, based on the login information, whether the access request has access permission.

It is worthwhile to note that when the access request received by the target authentication system does not include the login information, the authentication method provided in this implementation of the present specification further includes: sending a login information acquisition request to the client corresponding to the access request; and receiving an access request that includes the login information and that is sent by the client corresponding to the access request. The login information acquisition request can be presented on the client in a form of a login page, and the login information entered by the user is obtained by using the login page.

It is worthwhile to further note that the at least two authentication systems can use one or more login pages. For example, all the authentication systems use the same login page, or each login system correspondingly uses one login page.

When each login system correspondingly uses one login page, a login page presented on a client is a login page used by an authentication system corresponding to the client.

In an application example, the method further includes: receiving first permission information, where the first permission information is permission information sent by the target authentication system in response to the access request after the authentication on the access request succeeds; and sending the first permission information to a transmitter of the access request, so that the transmitter sets the first permission information in a new access request.

The first permission information can be used to authenticate an access request subsequently generated by the client.

For example, after the current authentication ends, when the client generates a new access request, the first permission information can be set in the new access request, to determine access permission of the new access request based on the first permission information.

In an application example, to ensure efficiency and accuracy of information exchange with the authentication system and alleviate confusion, when the access request is an http request, the method further includes: establishing a session with the target authentication system; and the receiving first permission information includes: receiving the first permission information based on the session, so that the target authentication system performs session control based on the session.

For example, when the received access request is an http request, the at least two authentication systems use the same authentication method, such as a session control (session-cookie) method, for the access request. In this case, because the respective pieces of first permission information sent by the at least two authentication systems are all in a form of session information, to alleviate confusion, after the http request is received, the session is established with the target authentication system corresponding to the http request, so that communication can be independently performed with the target authentication system based on the session, for example, the first permission information is received based on the session, so that the respective pieces of first permission information sent by different authentication systems can be kept independent of each other and do not interfered with each other.

For example, the at least two authentication systems are authentication system C and authentication system D. When the received access request is an http request, both authentication system C and authentication system D use the session-cookie authentication method for the http request. Therefore, when the target authentication system determined based on the http request is authentication system C, a session is established with authentication system C, the http request is sent to authentication system C based on the established session, and sessionID sent by authentication system C in response to the access request is received after the authentication succeeds. When the target authentication system is authentication system D, a communication process is the same as the communication process of performing authentication on the access request by using authentication system C, and details are omitted here for simplicity.

In such a communication method, information can be separately exchanged with different authentication systems, thereby alleviating confusion caused when the at least two authentication systems perform authentication on the access request by using the same authentication method, and improving communication efficiency and accuracy.

Further, the sending the first permission information to a transmitter of the access request can be sending the received first permission information to the client that generates the access request, so that the client can use the first permission information in a subsequent access process. For example, when the first permission information is in a form of session information, sessionID information corresponding to a session is sent to the client, so that a cookie including sessionID is set in a new access request generated by the client.

The authentication systems separately perform authentication on access requests and correspondingly access related information without affecting each other, so that a user who uses a client does not perceive a difference between different authentication systems, thereby improving user experience.

It is worthwhile to note that the authentication method provided in this implementation of the present specification can be run in a form of an interceptor, and the interceptor can be disposed on a client or a server.

The authentication method provided in the present specification is described below by using the following example: An interceptor is used as an execution body, and authentication on an access request that does not have access permission is performed based on two authentication systems.

Figure 3A:
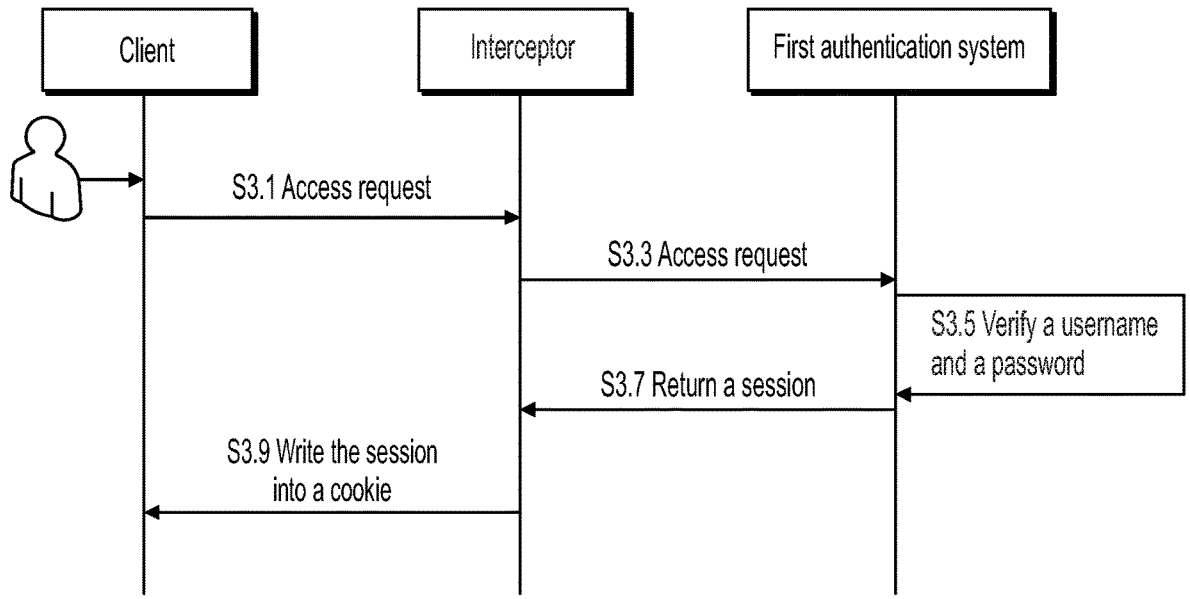
FIG. 3a and FIG. 3b are interaction flowcharts illustrating an authentication method, according to an implementation of the present specification.
Figure 3B:
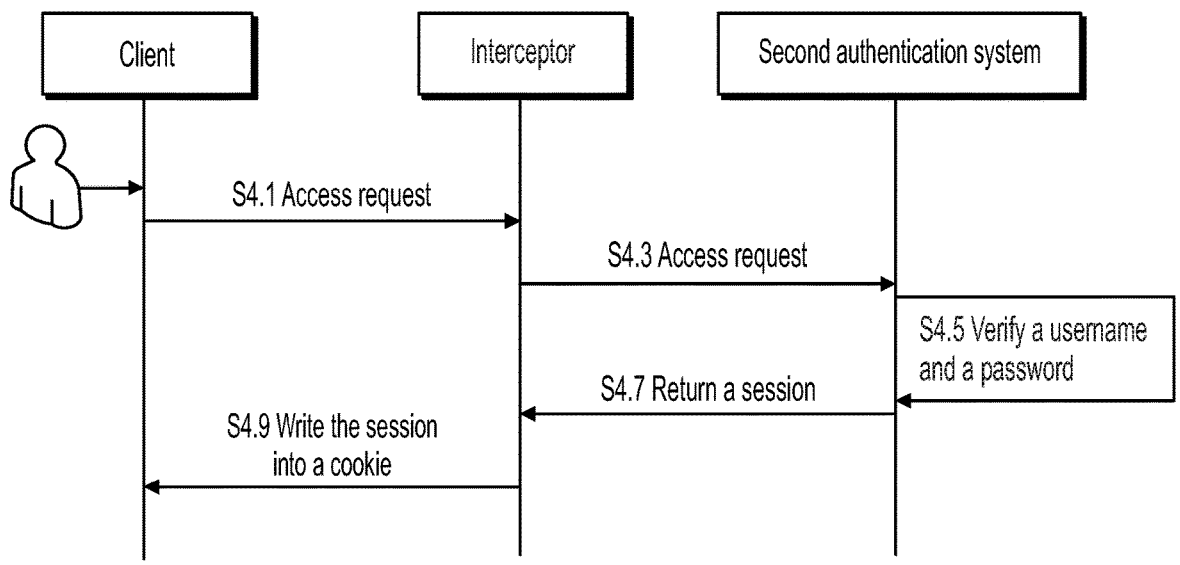

FIG. 3a and FIG. 3b are interaction flowcharts illustrating an authentication method, according to an implementation of the present specification.

As shown in FIG. 3a, a user performs an operation on a client, for example, clicks on a page and enters a username and a password. The client generates an access request that includes the username and the password, and performs step S3.1 of sending the access request to an interceptor. The interceptor determines a target authentication system from two authentication systems based on an authentication system selection policy and based on identification information in the access request, establishes a session with the target authentication system, and allocates the access request to the target authentication system based on the established session. The target authentication system performs authentication based on the received access request. When the target authentication system of the access request is a first authentication system, the interceptor performs, based on a session between the interceptor and the first authentication system, step S3.3 of sending the access request to the first authentication system. The first authentication system performs step S3.5 of verifying the username and the password in the access request, generates a session (for example, sessionID) after the verification succeeds, and performs, based on the session between the interceptor and the first authentication system, step S3.7 of sending sessionID to the interceptor in response to the access request. The interceptor performs step S3.9 of sending received sessionID to the client, so that the client correspondingly writes sessionID into a cookie of the client.

As shown in FIG. 3b, after a user performs an operation on a client, the client generates an access request that includes a username and a password, and performs step S4.1 of sending the access request to an interceptor. When the interceptor determines, based on an authentication system selection policy and based on identification information in the access request, that a target authentication system of the access request is a second authentication system, the interceptor performs, based on a session between the interceptor and the second authentication system, step S4.3 of sending the access request to the second authentication system. The second authentication system performs step S4.5 of verifying the username and the password in the access request, generates a session after the verification succeeds, and performs, based on communication between the interceptor and the second authentication system, step S4.7 of sending sessionID to the interceptor in response to the access request. The interceptor performs step S4.9 of sending received sessionID to the client, so that the client correspondingly writes sessionID into a cookie of the client. As such, after the authentication succeeds, the client can set the cookie including sessionID in a new access request and sends the new access request to the interceptor.

The previously described at least one technical solution used in this implementation of the present specification can achieve the following beneficial effects: According to the authentication method provided in this implementation of the present specification, the at least two authentication systems are separately deployed in the micro service framework as micro service components. When it is determined that the access request does not have access permission, the target authentication system is determined based on the authentication system selection policy and based on the identification information in the access request, and then the access request is sent to the target authentication system, so that the target authentication system performs authentication on the access request. Therefore, the authentication method provided in this implementation of the present specification can ensure successful execution of an authentication process while being compatible with multiple authentication systems, to alleviate unnecessary confusion. In addition, the authentication method has simple configuration and is easy to operate.

Implementation 2

Figure 4:
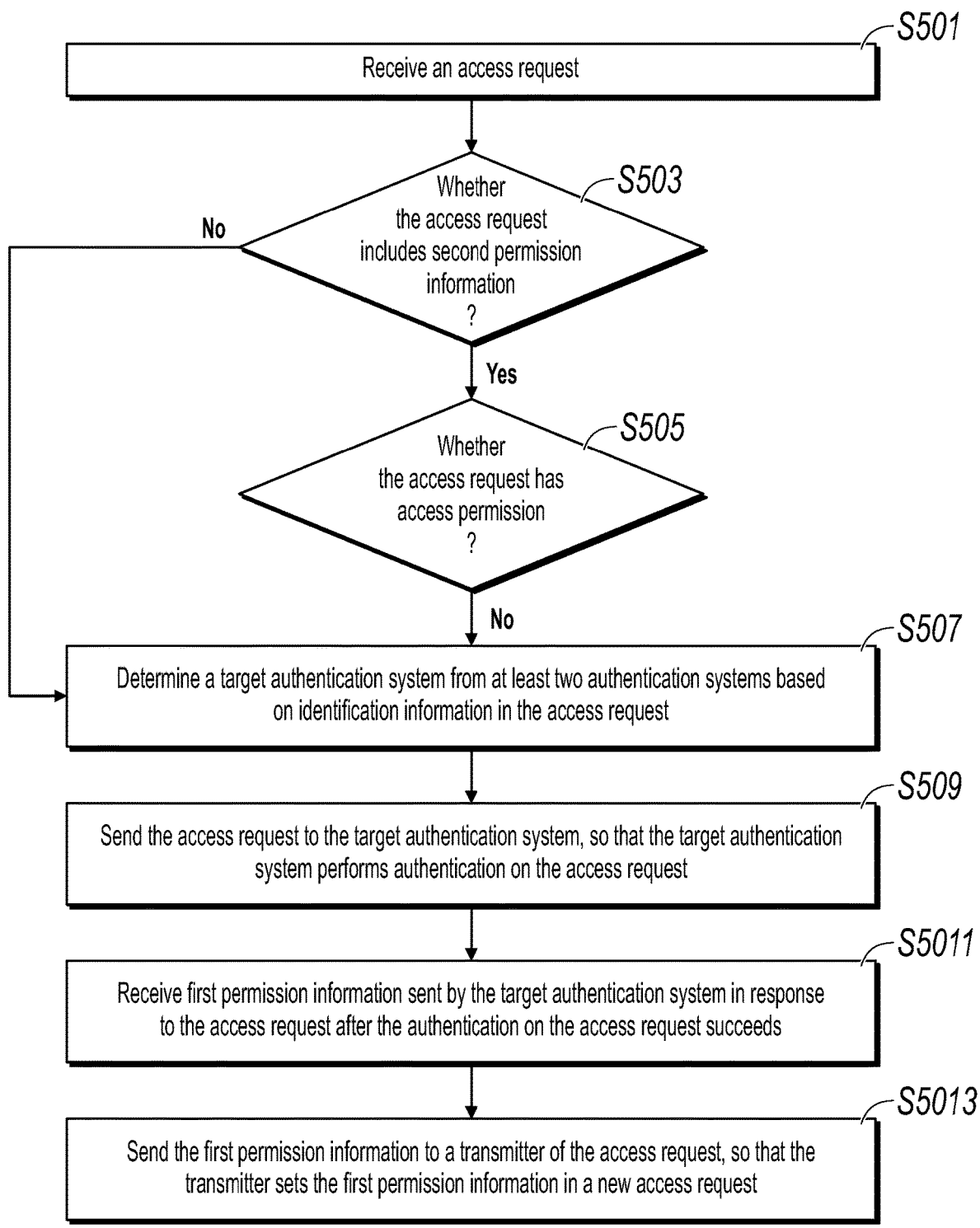
FIG. 4 is a flowchart illustrating an authentication method, according to an implementation of the present specification.

FIG. 4 is a flowchart illustrating an authentication method, according to an implementation of the present specification.

As shown in FIG. 4, the authentication method in this implementation of the present specification includes the following steps.

Step S501: Receive an access request.

The access request is a request sent by a client.

Step S503: Determine whether the access request includes second permission information; and if the access request includes the second permission information, perform step S505; or if the access request does not include the second permission information, perform step S507.

The second permission information includes permission information generated by a target authentication system when authentication on an access request including login information succeeds, and the access request including the login information is an access request sent by a transmitter of the access request before sending the access request in step S501.

For example, the access request received in step S501 is the current access request. Before the client generates the current access request, the target authentication system verifies the received access request including the login information from the client, and generates the second permission information after the verification succeeds. Then, the second permission information is returned to the client. Therefore, the client has stored the second permission information before generating the current access request. Therefore, the client sets the second permission information in the generated current access request, so that the target authentication system can determine, based on the second permission information, whether the current access request has access permission. Therefore, in step S503, the second permission information in the received access request can be used to determine whether the access request has access permission.

The following provides description by using an example in which the second permission information is in a form of session information: If the authentication performed by the target authentication system on the access request that includes the login information and that is previously sent by the client succeeds, the client receives sessionID sent by the target authentication system. That is, the client has stored sessionID before performing the current access. Therefore, the generated current access request can include a cookie that sessionID is set in, so that the access request received in in step S501 includes the cookie. Therefore, in step S503, whether the access request has access permission can be determined by determining whether the access request includes the cookie. If the access request does not include the cookie, it is determined that the access request does not have access permission; or if the access request includes the cookie, whether the access request has access permission needs to be further determined.

Step S505: Determine, based on the second permission information, whether the access request has access permission; and if the access request does not have access permission, perform step S507.

Specifically, authentication is performed on the second permission information. If the authentication succeeds, it is determined that the access request has access permission; or if the authentication fails, it is determined that the access request does not have access permission, that is, authentication needs to be performed on the access request.

For example, when authentication is performed on the second permission information, a target authentication system can be determined from at least two authentication systems based on a predetermined authentication system selection policy and identification information in the access request received in step S501, and the access request can be sent to the target authentication system, so that the target authentication system performs authentication on the second permission information. During authentication, the target authentication system obtains sessionID from the cookie included in the access request, queries the corresponding session based on sessionID. If correct session information can be queried, the authentication succeeds; or if no session can be queried or an incorrect session is queried, the authentication fails.

Step S507: Determine a target authentication system from at least two authentication systems based on identification information in the access request.

Step S509: Send the access request to the target authentication system, so that the target authentication system performs authentication on the access request.

Step S5011: Receive first permission information.

The first permission information is permission information sent by the target authentication system in response to the access request after the authentication on the access request succeeds.

Step S5013: Send the first permission information to the transmitter of the access request, so that the transmitter sets the first permission information in a new access request.

The first permission information is used to determine whether the new access request has access permission.

Specifically, the first permission information is sent to the client that generates the access request, so that the client sets the first permission information in the new access request.

Implementation 3

Figure 5:
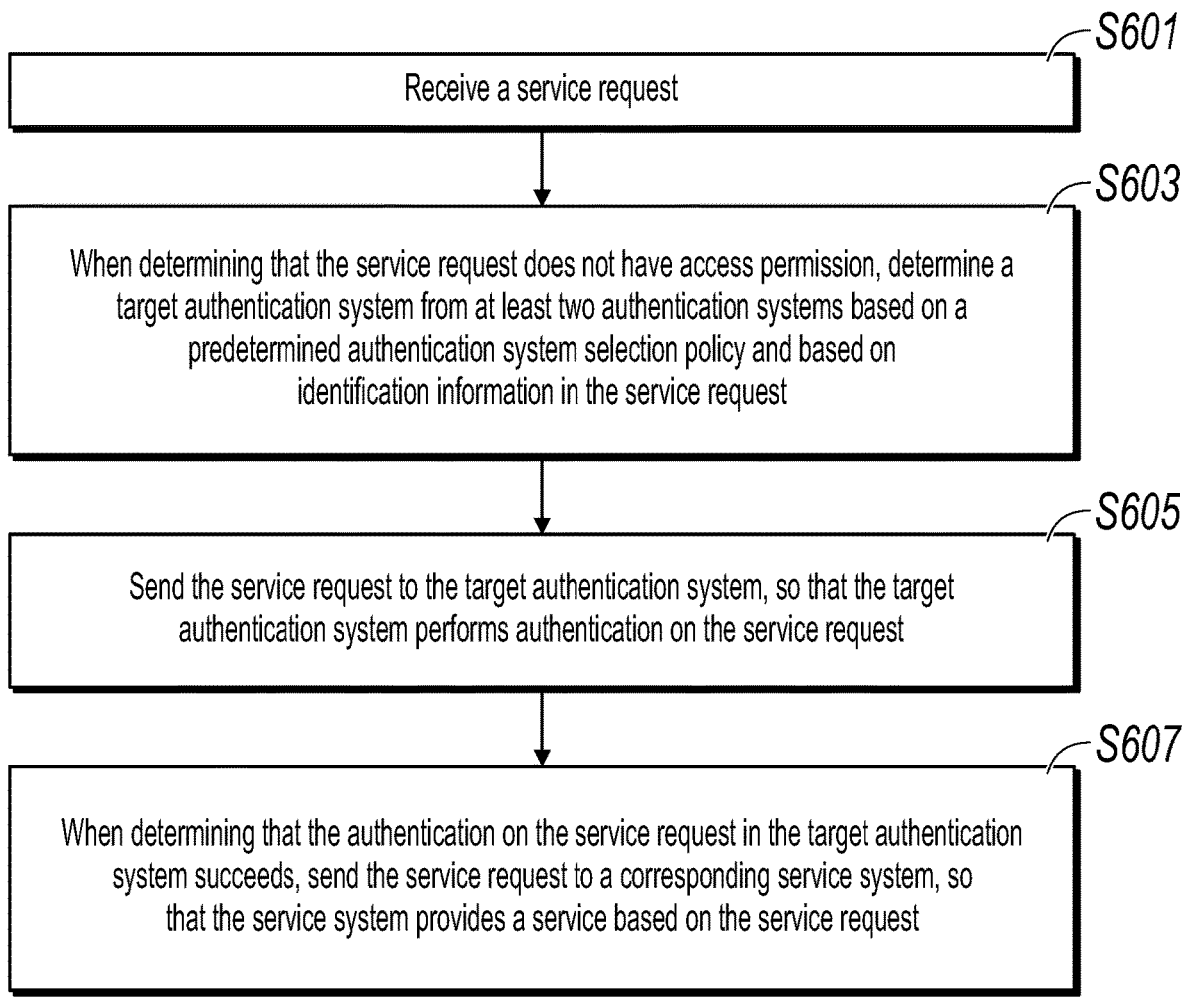
FIG. 5 is a flowchart illustrating a business service method, according to an implementation of the present specification.

FIG. 5 is a flowchart illustrating a business service method, according to an implementation of the present specification.

As shown in FIG. 5, the business service method in this implementation of the present specification includes the following steps.

Step S601: Receive a business service request.

Step S603: When determining that the business service request does not have access permission, determine a target authentication system from at least two authentication systems based on a predetermined authentication system selection policy and based on identification information in the business service request.

The authentication system selection policy specifies mapping relationships between identification information and authentication systems, and the at least two authentication systems are separately deployed in a micro service framework as micro service components.

Step S605: Send the business service request to the target authentication system, so that the target authentication system performs authentication on the business service request.

Step S607: When determining that the authentication on the business service request in the target authentication system succeeds, send the business service request to a corresponding business service system, so that the business service system provides a business service based on the business service request.

Specifically, in step S607, it can be determined that the authentication succeeds by receiving first permission information sent by the target authentication system when the authentication on the business service request succeeds; or it can be determined that the authentication succeeds when authentication failure information sent by the target authentication system is not received within a predetermined time period; or it can be determined that the authentication succeeds by using another pre-agreed method.

In an application example, in step S603, when determining that the business service request has access permission, the business service request is sent to a corresponding business service system, so that the business service system provides a business service based on the business service request.

It is worthwhile to further note that, in this implementation of the present specification, the business service system can be independently deployed in the micro service framework as a micro service component; or can be deployed by using another deployment method, and in this case, the service system may be deployed in the micro service framework, or may not be deployed in the micro service framework.

The business service method provided in this implementation of the present specification is described below by using the following example: The access request is an http request, and the first permission information is in a form of session information.

Figure 6:
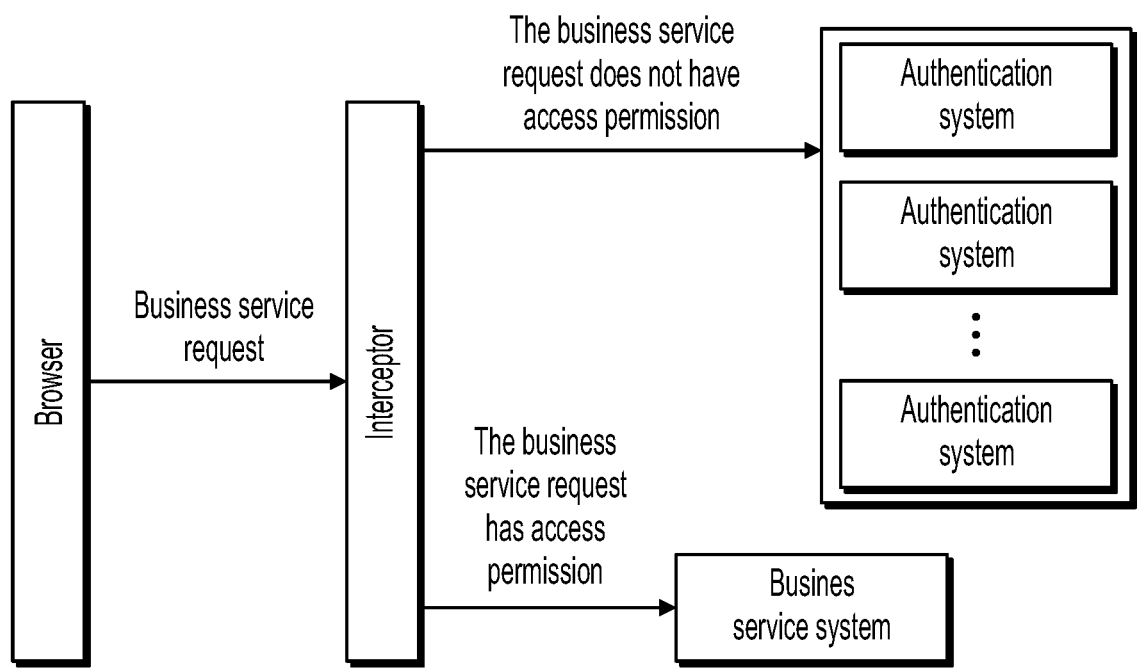
FIG. 6 is a schematic architectural diagram illustrating a business service method, according to an implementation of the present specification.

FIG. 6 is a schematic architectural diagram illustrating providing a business service by using a business service method according to an implementation of the present specification. The business service method is set in an interceptor.

As shown in FIG. 6, in the business service method provided in the present specification, a user performs an operation on a browser, and the browser sends a business service request corresponding to the user operation to the interceptor. When determining that the received business service request has access permission, the interceptor sends the business service request to a corresponding service system; or when determining that the received business service request does not have access permission, the interceptor sends the business service request to at least two authentication systems for authentication. The at least two authentication systems are separately deployed in a micro service framework as micro service components.

Figure 7:
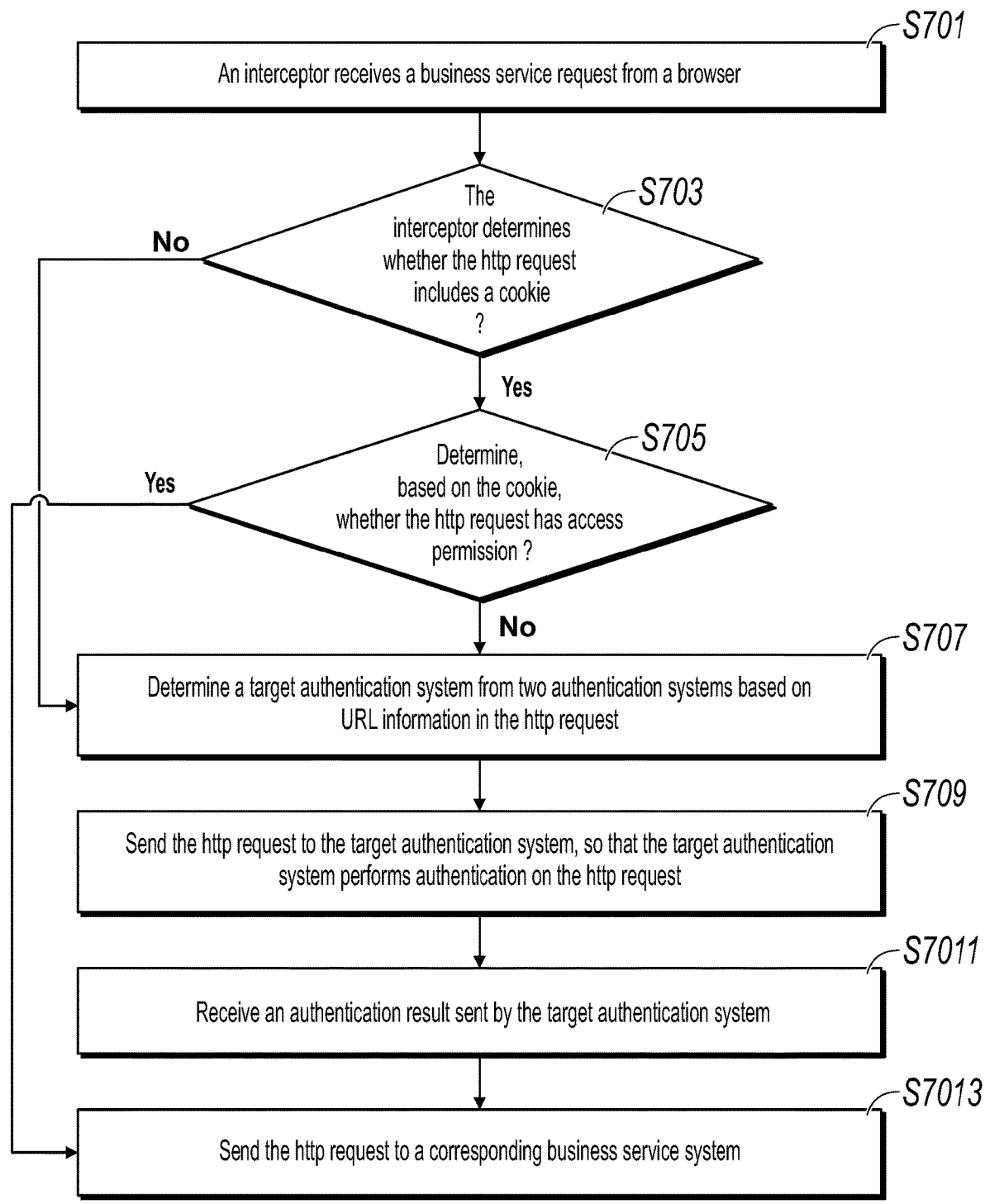
FIG. 7 is a flowchart illustrating a business service method, according to an implementation of the present specification.

FIG. 7 is a flowchart illustrating a business service method, according to an implementation of the present specification.

As shown in FIG. 7, specifically, for example, a browser generates an http request to obtain a business service from a server, and an interceptor disposed on the server is used as an execution body. The business service method in this implementation of the present specification includes the following steps.

Step S701: The interceptor receives a business service request from the browser.

Specifically, when the browser needs to access a business service system, the browser first sends the generated http request to the interceptor.

Step S703: The interceptor determines whether the http request includes a cookie; if the http request includes the cookie, perform step S705; or if the http request does not include the cookie, perform step S707.

Step S705: Determine, based on the cookie, whether the http request has access permission; if the http request does not have access permission, perform step S707; or if the http request has access permission, perform step S7013.

Specifically, the interceptor determines, based on URL information in the http request, a target authentication system that is to perform authentication on the cookie, sends the http request to the target authentication system for authentication based on a session established between the interceptor and the target authentication system, and determines, based on a result of the authentication performed by the target authentication system on the cookie, whether the http request has access permission.

Two authentication systems are separately deployed in a micro service framework as micro service components.

Step S707: Determine a target authentication system from the two authentication systems based on the URL information in the http request.

Specifically, for the http request that needs authentication, the interceptor determines the target authentication system based on the URL information in the http request.

It is worthwhile to note that, step S705 and step S707 can be processed by disposing different processing modules on one interceptor, or can be separately processed by disposing two different interceptors.

The two authentication systems separately verify login information from an external system and a service request from the external system.

Step S709: Send the http request to the target authentication system, so that the target authentication system performs authentication on the http request.

The interceptor sends the http request to the target authentication system based on a session established between the interceptor and the target authentication system.

After the target authentication system receives the http request from the interceptor, if the http request includes a username and a password, the target authentication system directly performs verification based on the username and the password in the received http request; or if the http request does not include the username or the password, the interceptor obtains an http request including the username and the password from the corresponding browser.

Further, if the verification succeeds, the target authentication system correspondingly generates a session, where session information is stored in the server.

Step S7011: Receive an authentication result sent by the target authentication system; and if the authentication result is that the authentication succeeds, perform step S7013.

If the authentication succeeds, the interceptor receives, based on the session established between the interceptor and the target authentication system, sessionID sent by the target authentication system in response to the http request, and sends sessionID to the browser.

Step 7013: Send the http request to a corresponding business service system.

Specifically, when the http request has access permission, the interceptor sends the http request to the corresponding business service system, so that the business service system executes subsequent service logic based on the http request.

Implementation 4

Based on the same inventive concept, the implementations of the present specification further provide an apparatus, an electronic device, and a nonvolatile computer storage medium that correspond to the authentication method.

Since the method has been described in detail in the previously described implementations, corresponding content related to the apparatus, the electronic device, and the nonvolatile computer storage medium that correspond to the method is not described in the following implementations.

Figure 8:
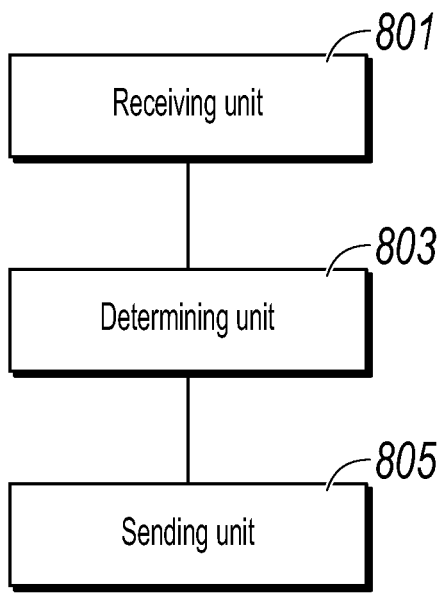
FIG. 8 is a schematic structural diagram illustrating an authentication apparatus, according to an implementation of the present specification.

FIG. 8 is a schematic structural diagram illustrating an authentication apparatus, according to an implementation of the present specification.

As shown in FIG. 8, the authentication apparatus provided in this implementation of the present specification can include receiving unit 801, determining unit 803, and sending unit 805, where receiving unit 801 receives an access request; when determining that the access request does not have access permission, determining unit 803 determines a target authentication system from at least two authentication systems based on a predetermined authentication system selection policy and based on identification information in the access request, where the authentication system selection policy specifies mapping relationships between identification information and authentication systems, and the at least two authentication systems are separately deployed in a micro service framework as micro service components; and sending unit 805 sends the access request to the target authentication system, so that the target authentication system performs authentication on the access request.

Optionally, the identification information includes at least one of a uniform resource locator, a uniform resource identifier, or an authentication system interface parameter.

Optionally, the access request further includes login information; and that the target authentication system performs authentication on the access request includes: the target authentication system performs authentication on the access request based on the login information.

Optionally, the apparatus further includes a receiving unit; the receiving unit receives first permission information, where the first permission information is permission information sent by the target authentication system in response to the access request after the authentication on the access request succeeds; and the sending unit sends the first permission information to a transmitter of the access request, so that the transmitter sets the first permission information in a new access request.

Optionally, when the access request is an http request, the apparatus further includes an establishment unit; a session is established with the target authentication system by using the establishment unit; and the receiving first permission information includes: receiving the first permission information based on the session, so that the target authentication system performs session control based on the session.

Optionally, the step of determining that the access request does not have access permission includes: determining, by the determining unit, whether the access request includes second permission information, where the second permission information includes permission information generated by the target authentication system when authentication on an access request including login information succeeds, and the access request including the login information is an access request sent by a transmitter of the access request before sending the access request; and if the access request does not include the second permission information, determining, by the determining unit based on the second permission information, that the access request does not have access permission.

Optionally, if the access request includes the second permission information, the determining unit determines whether the access request has access permission.

Figure 9:
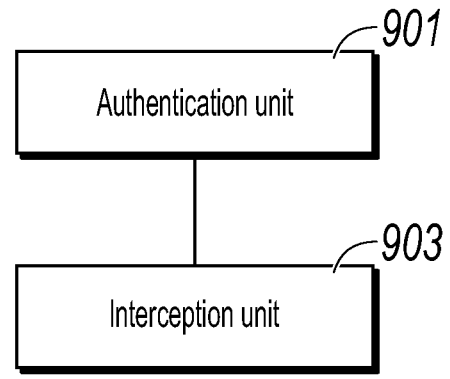
FIG. 9 is a schematic structural diagram illustrating an authentication system, according to an implementation of the present specification.

FIG. 9 is a schematic structural diagram illustrating an authentication system, according to an implementation of the present specification.

As shown in FIG. 9, the authentication system provided in this implementation of the present specification can include authentication unit 901 and interception unit 903, where at least two authentication systems are deployed in authentication unit 901 based on a micro service framework, and the at least two authentication systems are separately deployed in the micro service framework as micro service components; interception unit 903 receives an access request; when determining that the access request does not have access permission, interception unit 903 determines a target authentication system from the at least two authentication systems based on a predetermined authentication system selection policy and based on identification information in the access request, where the authentication system selection policy specifies mapping relationships between identification information and authentication systems; and interception unit 903 sends the access request to the target authentication system, so that the target authentication system performs authentication on the access request.

Based on the same inventive concept, an implementation of the present specification further provides an electronic device for authentication, including at least one processor and a memory, where the memory stores a program, and the at least one processor is configured to perform the following steps: receiving an access request; when determining that the access request does not have access permission, determining a target authentication system from at least two authentication systems based on a predetermined authentication system selection policy and based on identification information in the access request, where the authentication system selection policy specifies mapping relationships between identification information and authentication systems, and the at least two authentication systems are separately deployed in a micro service framework as micro service components; and sending the access request to the target authentication system, so that the target authentication system performs authentication on the access request.

For another function of the processor, references can be further made to the content recorded in the forgoing implementations. Details are omitted here for simplicity.

Based on the same inventive concept, an implementation of the present specification further provides a nonvolatile computer storage medium for authentication, including a program used in combination with an electronic device, where the program can be executed by a processor to complete the following steps: receiving an access request; when determining that the access request does not have access permission, determining a target authentication system from at least two authentication systems based on a predetermined authentication system selection policy and based on identification information in the access request, where the authentication system selection policy specifies mapping relationships between identification information and authentication systems, and the at least two authentication systems are separately deployed in a micro service framework as micro service components; and sending the access request to the target authentication system, so that the target authentication system performs authentication on the access request.

Implementation 5

Based on the same inventive concept, the implementations of the present specification further provide an apparatus, an electronic device, and a nonvolatile computer storage medium that correspond to the business service method.

Since the method has been described in detail in the previously described implementations, corresponding content related to the apparatus, the electronic device, and the nonvolatile computer storage medium that correspond to the method is not described in the following implementations.

Figure 10:
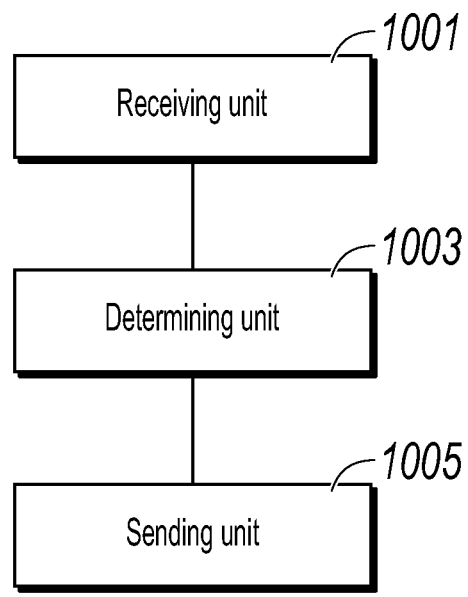
FIG. 10 is a schematic structural diagram illustrating a business service apparatus, according to an implementation of the present specification.

FIG. 10 is a schematic structural diagram illustrating a business service apparatus, according to an implementation of the present specification.

As shown in FIG. 10, the business service apparatus provided in this implementation of the present specification can include receiving unit 1001, determining unit 1003, and sending unit 1005, where receiving unit 1001 receives a business service request; when determining that the business service request does not have access permission, determining unit 1003 determines a target authentication system from at least two authentication systems based on a predetermined authentication system selection policy and based on identification information in the business service request, where the authentication system selection policy specifies mapping relationships between identification information and authentication systems, and the at least two authentication systems are separately deployed in a micro service framework as micro service components; sending unit 1005 sends the business service request to the target authentication system, so that the target authentication system performs authentication on the business service request; and when determining that the authentication on the business service request in the target authentication system succeeds, sending unit 1005 sends the business service request to a corresponding business service system, so that the business service system provides a business service based on the business service request.

Optionally, when determining that the business service request has access permission, the sending unit sends the business service request to a corresponding business service system, so that the business service system provides a business service based on the business service request.

Based on the same inventive concept, an implementation of the present specification further provides an electronic device for proving a service, including at least one processor and a memory, where the memory stores a program, and the at least one processor is configured to perform the following steps: receiving a business service request; when determining that the business service request does not have access permission, determining a target authentication system from at least two authentication systems based on a predetermined authentication system selection policy and based on identification information in the business service request, where the authentication system selection policy specifies mapping relationships between identification information and authentication systems, and the at least two authentication systems are separately deployed in a micro service framework as micro service components; sending the business service request to the target authentication system, so that the target authentication system performs authentication on the business service request; and when determining that the authentication on the business service request in the target authentication system succeeds, sending the business service request to a corresponding business service system, so that the business service system provides a business service based on the business service request.

For another function of the processor, references can be further made to the content recorded in the forgoing implementations. Details are omitted here for simplicity.

Based on the same inventive concept, an implementation of the present specification further provides a nonvolatile computer storage medium for providing a service, including a program used in combination with an electronic device, where the program can be executed by a processor to complete the following steps: receiving a business service request; when determining that the business service request does not have access permission, determining a target authentication system from at least two authentication systems based on a predetermined authentication system selection policy and based on identification information in the business service request, where the authentication system selection policy specifies mapping relationships between identification information and authentication systems, and the at least two authentication systems are separately deployed in a micro service framework as micro service components; sending the business service request to the target authentication system, so that the target authentication system performs authentication on the business service request; and when determining that the authentication on the business service request in the target authentication system succeeds, sending the business service request to a corresponding business service system, so that the business service system provides a business service based on the business service request.

Specific implementations of the present application are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and parallel processing can be or may be advantageous.

The implementations of the present specification are described in a progressive way. For same or similar parts of the implementations, mutual references can be made to the implementations. Each implementation focuses on a difference from other implementations. Especially, an apparatus implementation, a device implementation, and a nonvolatile computer storage medium implementation are basically similar to a method implementation, and therefore are described briefly. For related parts, references can be made to some descriptions in the method implementation.

The apparatus, the device, and the nonvolatile computer storage medium provided in the implementations of the present specification correspond to the method. Therefore, the apparatus, the device, and the nonvolatile computer storage medium also have similar beneficial technical effects to the corresponding method. The beneficial technical effects of the method are described in detail above, and therefore the beneficial technical effects of the corresponding apparatus, device, and nonvolatile computer storage medium are omitted here for simplicity.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method procedure can be readily obtained once the method procedure is logically programmed by using several of the previously described hardware description languages and is programmed into an integrated circuit.

A controller can be implemented by using any appropriate method. For example, the controller can be in a form a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art also knows that, in addition to implementing the controller by using only the computer-readable program code, method steps can be logically programmed to allow the controller to implement the same function in forms of the logic gate, the switch, the application-specific integrated circuit, the programmable logic controller, and the built-in microcontroller. Therefore, the controller can be considered as a hardware component, and an apparatus that is included in the controller and configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the previously described apparatus is described, the previously described apparatus is divided into various units based on functions for separate description. Certainly, when the present application is implemented, functions of the units can be implemented in one or more pieces of software and/or hardware.

A person skilled in the art should understand that an implementation of the present invention can be provided as a method, a system, or a computer program product. Therefore, the present invention can use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, an optical memory, etc.) that include computer-usable program code.

The present invention is described with reference to the flowcharts and/or block diagrams of the method, the device (system), and the computer program product according to the implementations of the present invention. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate a device for implementing a specific function in one or more processes in the flowcharts and/or in one or more blocks in the block diagrams.

Alternatively, these computer program instructions can be stored in a computer-readable memory that can instruct a computer or another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, or a magnetic tape/magnetic disk storage or another magnetic storage device. The computer storage medium can be configured to store information accessible to a computing device. Based on the definition in the present specification, the computer-readable medium does not include computer-readable transitory media such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from other implementations. Especially, a system implementation is basically similar to a method implementation, and therefore is described briefly. For related parts, references can be made to some descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
receiving, by a server and from a client device, an access request, wherein the access request comprises identification information to be used by the server for selecting a target authentication system;
determining, by the server, that the access request does not have access permission; and
in response to determining, by the server, that the access request does not have access permission:
selecting, by the server, the target authentication system from at least two authentication systems, based on a predetermined authentication system selection policy and based on the identification information in the access request, wherein the authentication system selection policy specifies mapping relationships between identification information and authentication systems, and the at least two authentication systems are separately deployed in a micro service framework as micro service components; and
sending, by the server and to the selected target authentication system, the access request, for authentication of the access request by the selected target authentication system.

2. The computer-implemented method of claim 1, wherein the identification information comprises at least one of a uniform resource locator, a uniform resource identifier, and an authentication system interface parameter.

3. The computer-implemented method of claim 1, wherein the access request received by the server from the client device further comprises login information, wherein authentication of the access request by the selected target authentication system comprises performing authentication on the access request based on the login information.

4. The computer-implemented method of claim 1, further comprising:
receiving, by the server and from the selected target authentication system, first permission information, wherein the first permission information is provided by the target authentication system in response to successful authentication of the access request; and
sending, by the server and to the client device, the first permission information, for inclusion of the first permission information by the client device in a new access request.

5. The computer-implemented method of claim 4, wherein the access request is an http request, the method further comprising:
establishing a session with the target authentication system, wherein receiving the first permission information comprises receiving the first permission information based on the session.

6. The computer-implemented method of claim 1, wherein determining that the access request does not have access permission comprises determining that the access request does not include second permission information having been generated by the target authentication system in response to successful authentication of a prior access request from the client device, the prior access request comprising login information.

7. The computer-implemented method of claim 1, further comprising:
receiving, by the server, and from the client device, a subsequent access request;
determining, by the server, that the subsequent access request does include second permission information having been generated by the target authentication system in response to successful authentication of a prior access request from the client device; and
in response to determining that the subsequent access request does include second permission information, determining, based on the second permission information, that the subsequent access request has access permission.

8. A non-transitory, computer-readable medium storing one or more instructions executable by a computer system to perform operations comprising:
receiving, by a server and from a client device, an access request, wherein the access request comprises identification information to be used by the server for selecting a target authentication system;
determining, by the server, that the access request does not have access permission; and
in response to determining, by the server, that the access request does not have access permission:
selecting, by the server, the target authentication system from at least two authentication systems, based on a predetermined authentication system selection policy and based on the identification information in the access request, wherein the authentication system selection policy specifies mapping relationships between identification information and authentication systems, and the at least two authentication systems are separately deployed in a micro service framework as micro service components; and
sending, by the server and to the selected target authentication system, the access request, for authentication of the access request by the selected target authentication system.

9. The computer-readable medium of claim 8, wherein the access request received by the server from the client device further comprises login information, wherein authentication of the access request by the selected target authentication system comprises performing authentication on the access request based on the login information.

10. The computer-readable medium of claim 8, the operations further comprising:
receiving, by the server and from the selected target authentication system, first permission information, wherein the first permission information is provided by the target authentication system in response to successful authentication of the access request; and
sending, by the server and to the client device, the first permission information, for inclusion of the first permission information by the client device in a new access request.

11. The computer-readable medium of claim 10, wherein the access request is an http request, the operations further comprising:
establishing a session with the target authentication system, wherein receiving the first permission information comprises receiving the first permission information based on the session.

12. The computer-readable medium of claim 8, wherein determining that the access request does not have access permission comprises determining that the access request does not include second permission information having been generated by the target authentication system in response to successful authentication of a prior access request from the client device, the prior access request comprising login information.

13. The computer-readable medium of claim 8, the operations further comprising:
receiving, by the server, and from the client device, a subsequent access request;
determining, by the server, that the subsequent access request does include second permission information having been generated by the target authentication system in response to successful authentication of a prior access request from the client device; and
in response to determining that the subsequent access request does include second permission information, determining, based on the second permission information, that the subsequent access request has access permission.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a server and from a client device, an access request, wherein the access request comprises identification information to be used by the server for selecting a target authentication system;
determining, by the server, that the access request does not have access permission; and
in response to determining, by the server, that the access request does not have access permission:
selecting, by the server, the target authentication system from at least two authentication systems, based on a predetermined authentication system selection policy and based on the identification information in the access request, wherein the authentication system selection policy specifies mapping relationships between identification information and authentication systems, and the at least two authentication systems are separately deployed in a micro service framework as micro service components; and
sending, by the server and to the selected target authentication system, the access request, for authentication of the access request by the selected target authentication system.

15. The computer-implemented system of claim 14, wherein the access request received by the server from the client device further comprises login information, wherein authentication of the access request by the selected target authentication system comprises performing authentication on the access request based on the login information.

16. The computer-implemented system of claim 14, the operations further comprising:
receiving, by the server and from the selected target authentication system, first permission information, wherein the first permission information is provided by the target authentication system in response to successful authentication of the access request; and
sending, by the server and to the client device, the first permission information, for inclusion of the first permission information by the client device in a new access request.

17. The computer-implemented system of claim 16, wherein the access request is an http request, the operations further comprising:
establishing a session with the target authentication system, wherein receiving the first permission information comprises receiving the first permission information based on the session.

18. The computer-implemented system of claim 14, wherein determining that the access request does not have access permission comprises determining that the access request does not include second permission information having been generated by the target authentication system in response to successful authentication of a prior access request from the client device, the prior access request comprising login information.

19. The computer-implemented system of claim 14, the operations further comprising:
- receiving, by the server, and from the client device, a subsequent access request;
- determining, by the server, that the subsequent access request does include second permission information having been generated by the target authentication system in response to successful authentication of a prior access request from the client device; and
- in response to determining that the subsequent access request does include second permission information, determining, based on the second permission information, that the subsequent access request has access permission.

\* \* \* \* \*